United States Patent
Guzman et al.

(10) Patent No.: US 8,397,504 B2
(45) Date of Patent: Mar. 19, 2013

(54) METHOD AND APPARATUS TO RECOVER AND CONVERT WASTE HEAT TO MECHANICAL ENERGY

(75) Inventors: Carlos Guzman, El Paso, TX (US); Larry Lee Walter, El Paso, TX (US)

(73) Assignee: Global Alternative Fuels, LLC, El Paso, TX (US)

( * ) Notice: Subject to any disclaimer, the term of this patent is extended or adjusted under 35 U.S.C. 154(b) by 522 days.

(21) Appl. No.: 12/701,865

(22) Filed: Feb. 8, 2010

(65) Prior Publication Data

US 2011/0193346 A1   Aug. 11, 2011

(51) Int. Cl.
 *F02G 3/00* (2006.01)
 *F02G 5/04* (2006.01)
 *F02G 5/02* (2006.01)
 *F01K 25/10* (2006.01)
 *F01K 23/10* (2006.01)
 *F01K 23/02* (2006.01)

(52) U.S. Cl. ............... 60/616; 60/618; 60/650; 60/651; 60/671

(58) Field of Classification Search .............. 60/599, 60/616, 618, 607–609, 649–651, 772, 670–673; F02G 5/04, 5/02; F01K 25/10
See application file for complete search history.

(56) References Cited

U.S. PATENT DOCUMENTS

| | | | |
|---|---|---|---|
| 3,796,045 A * | 3/1974 | Foster-Pegg | 60/772 |
| 4,069,672 A | 1/1978 | Milling | |
| 4,201,058 A * | 5/1980 | Vaughan | 60/618 |
| 5,029,444 A | 7/1991 | Kalina | |
| 5,133,298 A * | 7/1992 | Ahnger | 60/618 |
| 5,609,029 A * | 3/1997 | Ahnger et al. | 60/618 |
| 5,797,265 A * | 8/1998 | Hagglund | 60/599 |
| 6,125,631 A * | 10/2000 | Hagglund | 60/618 |
| 6,554,088 B2 | 4/2003 | Severinsky et al. | |
| 6,732,525 B2 | 5/2004 | Endoh et al. | |
| 7,013,846 B2 * | 3/2006 | Hagglund et al. | 123/25 B |
| 7,520,133 B2 * | 4/2009 | Hoetger et al. | 60/618 |
| 7,536,998 B2 * | 5/2009 | Held et al. | 123/542 |
| 2003/0116116 A1 | 6/2003 | Anton | |
| 2005/0262842 A1 * | 12/2005 | Claassen et al. | 60/618 |
| 2006/0272622 A1 | 12/2006 | Acuna et al. | |
| 2009/0241540 A1 | 10/2009 | Robel | |
| 2009/0255243 A1 | 10/2009 | Raab et al. | |

FOREIGN PATENT DOCUMENTS

JP      06033707 A  *  2/1994
JP   2012077630 A  *  4/2012

* cited by examiner

*Primary Examiner* — Thai Ba Trieu
(74) *Attorney, Agent, or Firm* — Tuesday A. Kaasch; Luis M. Ortiz; Kermit D. Lopez

(57) ABSTRACT

A method and system for waste heat recovery for conversion to mechanical energy. Exhaust is received from an engine into a first heat exchanger where heat from the exhaust is transferred to a refrigerant. The exhaust is then transferred to a regenerator module in order to produce electricity which is provided to a power box. The hot refrigerant from the first heat exchanger is transferred to a kinetic energy recovery system to produce electricity which is also transferred to said power box. The power box provides electricity to a traction motor and the traction motor turns an axle. The refrigerant is then transferred to a refrigerant cooling unit and then to a second heat exchanger wherein ambient air from the regenerator module is cooled. The refrigerant and cooled ambient air can be then transferred to an engine cooling jacket to cool the engine.

20 Claims, 7 Drawing Sheets

METHOD AND APPARATUS TO RECOVER AND CONVERT WASTE HEAT TO MECHANICAL ENERGY

TECHNICAL FIELD

Embodiments are generally related to the recovery of waste heat for conversion to mechanical energy. Embodiments are further related to the storage of energy generated from waste heat to increase fuel efficiency in a heat engine. Embodiments are additionally related to a waste heat recovery system that can be utilized in a vehicle to decrease engine size while increasing engine power and fuel efficiency.

BACKGROUND OF THE INVENTION

Energy production generally relies on the burning of fuels, whether in an automobile engine or in a power plant. Emerging problems such as fuel shortages and air pollution, however, necessitate a search for a more efficient use of fuels. Many approaches include a hybrid approach, wherein a combustion system is supplemented with mechanical power generated from electricity. Most of these systems rely on electricity produced utilizing regenerative braking. One such system is discussed in U.S. Pat. No. 6,554,088 to Severinsky et al. wherein a hybrid vehicle is disclosed that possesses an internal combustion engine, a traction motor, a starter motor, and a battery bank. In such a prior art configuration, a hybrid brake system provides regenerative braking to power the traction motor.

An alternative form of hybrid system functions by converting thermal energy to mechanical energy. One such example is discussed in U.S. Pat. No. 5,685,152 to Sterling, which discloses a thermal energy storage and conversion system that captures thermal energy from solar collectors, stores thermal energy in a first heated medium, converts a portion of stored thermal energy to mechanical energy by utilization of a heat engine, converts a second portion of stored thermal energy to a thermal energy sink by utilization of a refrigeration device, and stores a portion of thermal energy sink for use later.

Another example of such a system is discussed in U.S. Pat. No. 6,732,525 to Endoh et al. that discloses a waste heat recovery system for an internal combustion engine including first and second raised temperature portions where the temperature is higher at the first portion than at the second portion. A first evaporating portion generates a first vapor from the first raised temperature portion. A second evaporating portion generates a second vapor from the second raised temperature portion and with a lower pressure than the first vapor. First and second energy converting portions of a displacement type expander converts expansion energy of the first and second vapor into mechanical energy.

Lacking in the current technology, as exemplified by the above systems, is a means for utilizing heat produced during combustion to create mechanical energy that can, in turn, be utilized by the system to improve fuel efficiency and provide supplemental power. Further, there exists a need for a system that can be implemented in a vehicle so as to maximize engine power and allow for improved aerodynamics of the vehicle by utilizing a smaller engine.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is one aspect of the disclosed embodiments to provide a system for waste heat recovery from hot exhaust and hot refrigerant to be converted to mechanical energy in order to increase fuel efficiency in a heat engine.

It is another aspect of the disclosed embodiments to provide an engine having an exhaust outlet and a cooling jacket; a first heat exchanger connected to the cooling jacket and the exhaust outlet; a compressor connected to the first heat exchanger; a turbocharger connected to the compressor; a regenerator connected to the turbocharger and a power box; a traction motor connected to the power box; a second heat exchanger connected to the cooling jacket and the turbocharger; a refrigerant cooling unit connected to the second heat exchanger and an engine control module (ECM); and a kinetic energy recovery system (KERS) connected to the power box, the first heat exchanger, and the refrigerant cooling unit.

It is a further aspect of the disclosed embodiments to provide a method for waste heat recovery for conversion to mechanical energy having the steps: receiving exhaust from an engine utilizing a first heat exchanger wherein heat contained in said exhaust is transferred to a refrigerant; transferring the exhaust to a regenerator module wherein said regenerator produces electricity utilizing the exhaust; transferring said electricity to a power box; receiving the refrigerant utilizing said first heat exchanger; transferring the refrigerant to a kinetic energy recovery system to produce electricity which is transferred to said power box; transferring electricity from the power box to a traction motor wherein the traction motor turns an axle; receiving the refrigerant into a refrigerant cooling unit; transferring the refrigerant to a second heat exchanger wherein ambient air is cooled; and transferring said refrigerant and said cooled ambient air to an engine cooling jacket to cool said engine.

The aforementioned aspects and other objectives and advantages can now be achieved as described herein.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

It is to be understood by persons of ordinary skill in the art that the following descriptions are provided for purposes of illustration and not for limitation. An artisan understands there are many variations that lie within the spirit of the invention and the scope of the appended claims. Unnecessary detail of known functions and operations may be omitted from the current description so as not to obscure the present invention.

The disclosed embodiments herein relate to a system and method for recovering waste heat from an engine to be converted to mechanical energy in order to increase fuel efficiency and provide improved and uniform cooling of the engine. While the system and method are discussed in the context of a diesel engine vehicle, it is to be appreciated that this is for exemplary purposes only and that the core functionality of the disclosed system may also be applied to any system utilizing a heat engine (e.g. power plants).

Figure 1:
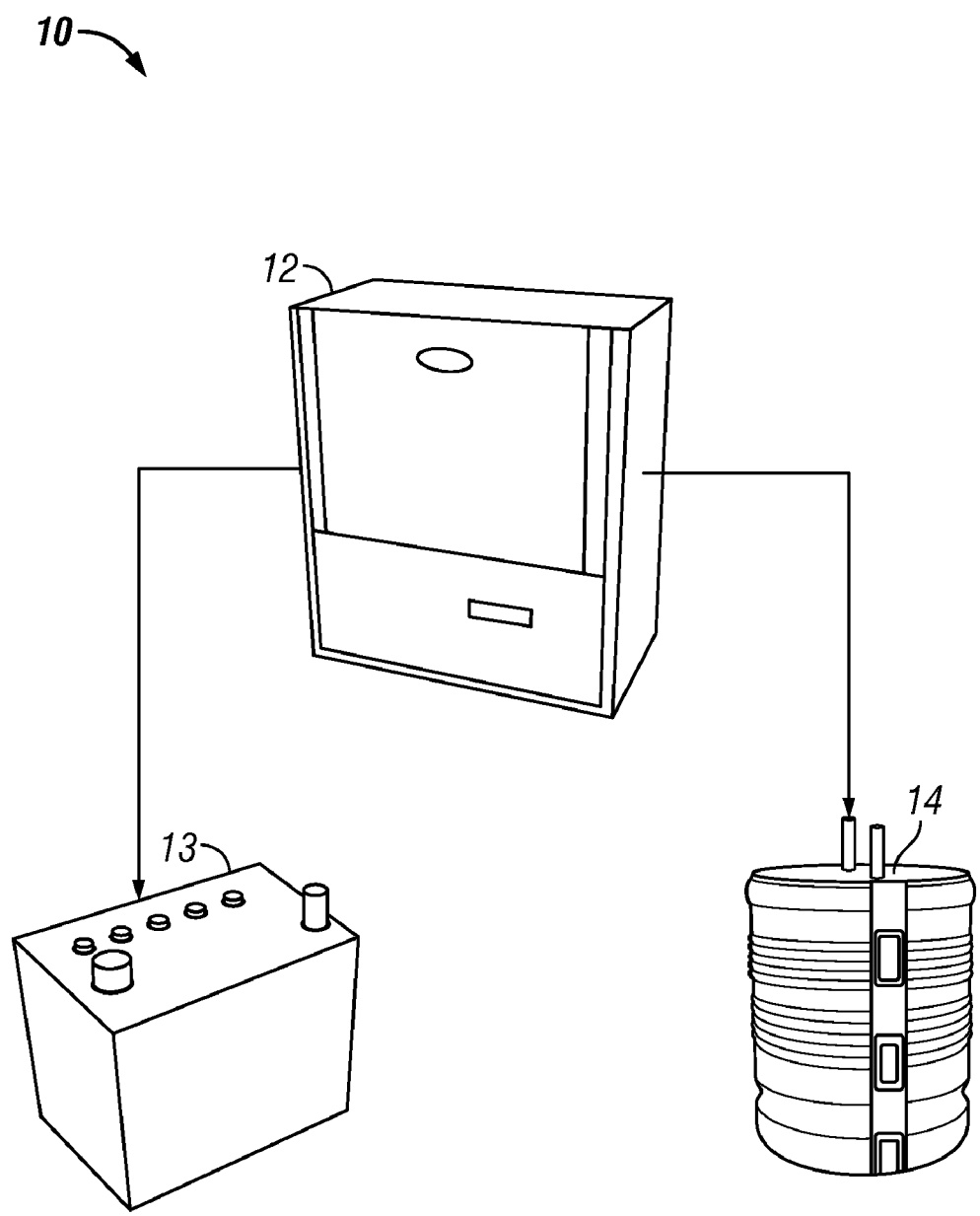
FIG. 1 illustrates a power box having an AC/DC inverter connected to a battery pack, and a capacitor.
Figure 2:
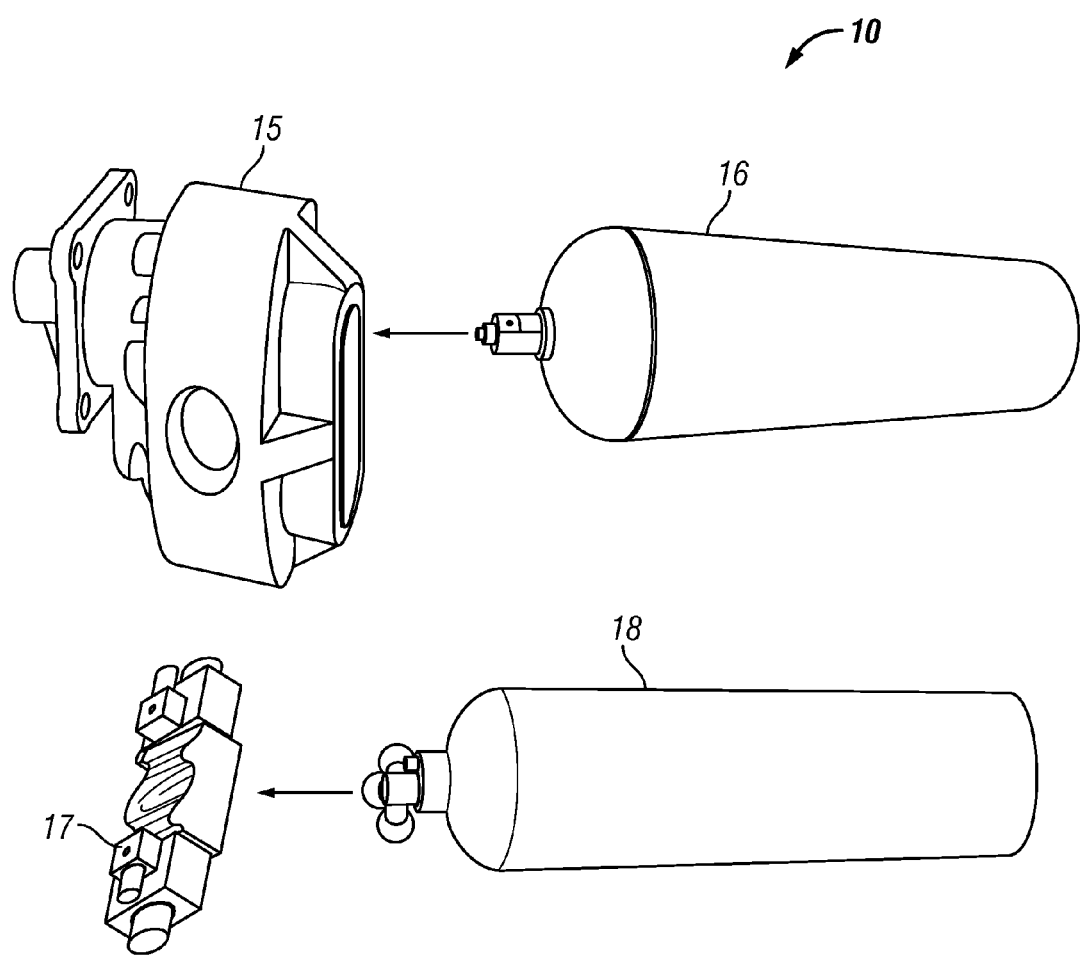
FIG. 2 illustrates a power box having a hydraulic fluid pump, hydraulic fluid reservoir, valves, and a high pressure hydraulic fluid tank.
Figure 3:
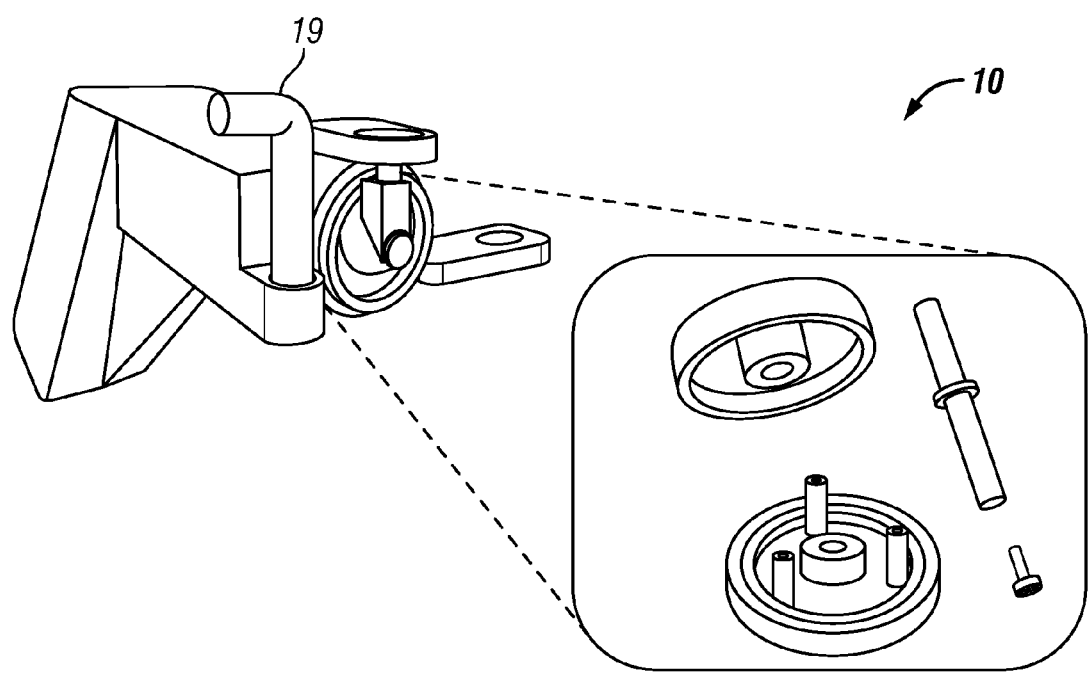
FIG. 3 illustrates a power box having a flywheel within a vacuum.

As indicated in FIG. 1, a power box 10 is illustrated, which includes an AC/DC inverter 12 connected to a battery pack 13 and a capacitor 14, in accordance with the disclosed embodiments. The battery pack 13 can be provided as a molten salt battery in order to achieve high energy density and high power density. One of the primary functions of the power box 10 is to receive and store electricity and provide electricity to a traction motor 122 (shown in FIG. 6). The power box 10 can also function as an auxiliary power unit. FIG. 2 shows an alternate embodiment wherein the power box 10 comprises a hydraulic fluid pump 15, a hydraulic fluid reservoir 16, valves 17 and a high pressure hydraulic fluid tank 18. FIG. 3 illustrates an alternate embodiment wherein the power box 10 possesses a flywheel 19 within a vacuum such that the flywheel 19 stores energy, rotationally, for later use by the traction motor 122. Note that in FIGS. 1-8, identical or similar parts or elements are indicated by identical reference numerals.

Figure 4:
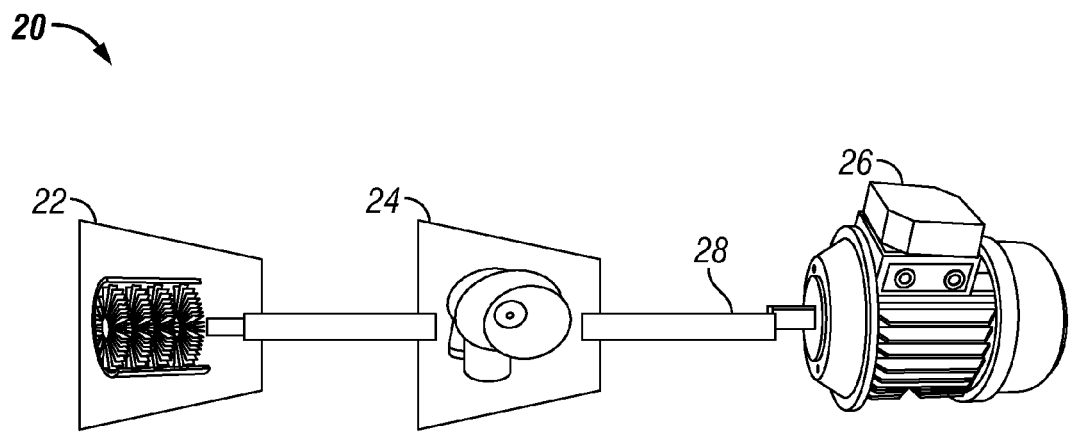
FIG. 4 illustrates a regenerator module having a compressor, a turbocharger, and a regenerator.

In FIG. 4, a regenerator module 20 is shown comprising a compressor 22, a turbocharger 24 and a regenerator 26. The regenerator module 20 functions to compress exhaust from the engine 112 (shown in FIG. 6) before it enters the turbocharger 24. A common shaft 28 connects the components of the regenerator module 20.

Figure 5:
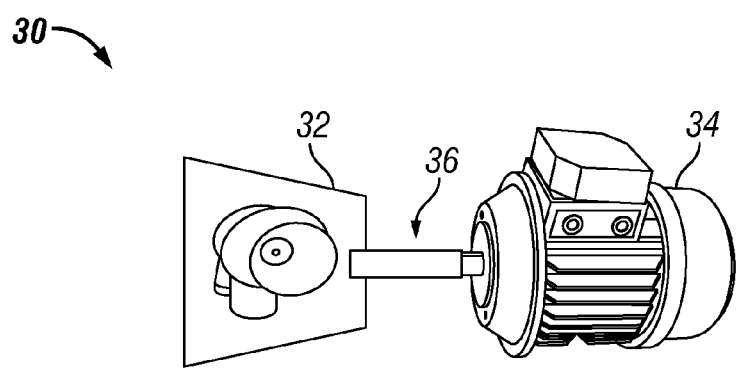
FIG. 5 illustrates a kinetic energy recover system (KERS) having a second turbocharger and a generator being connected by a shaft.

FIG. 5 illustrates a kinetic energy recover system (KERS) 30 comprising a second turbocharger 32 and a generator 34 being connected by a shaft 36. The KERS 30 functions to capture heat from the engine 112 and exhaust to generate electricity which is then transferred to the power box.

Figure 6:
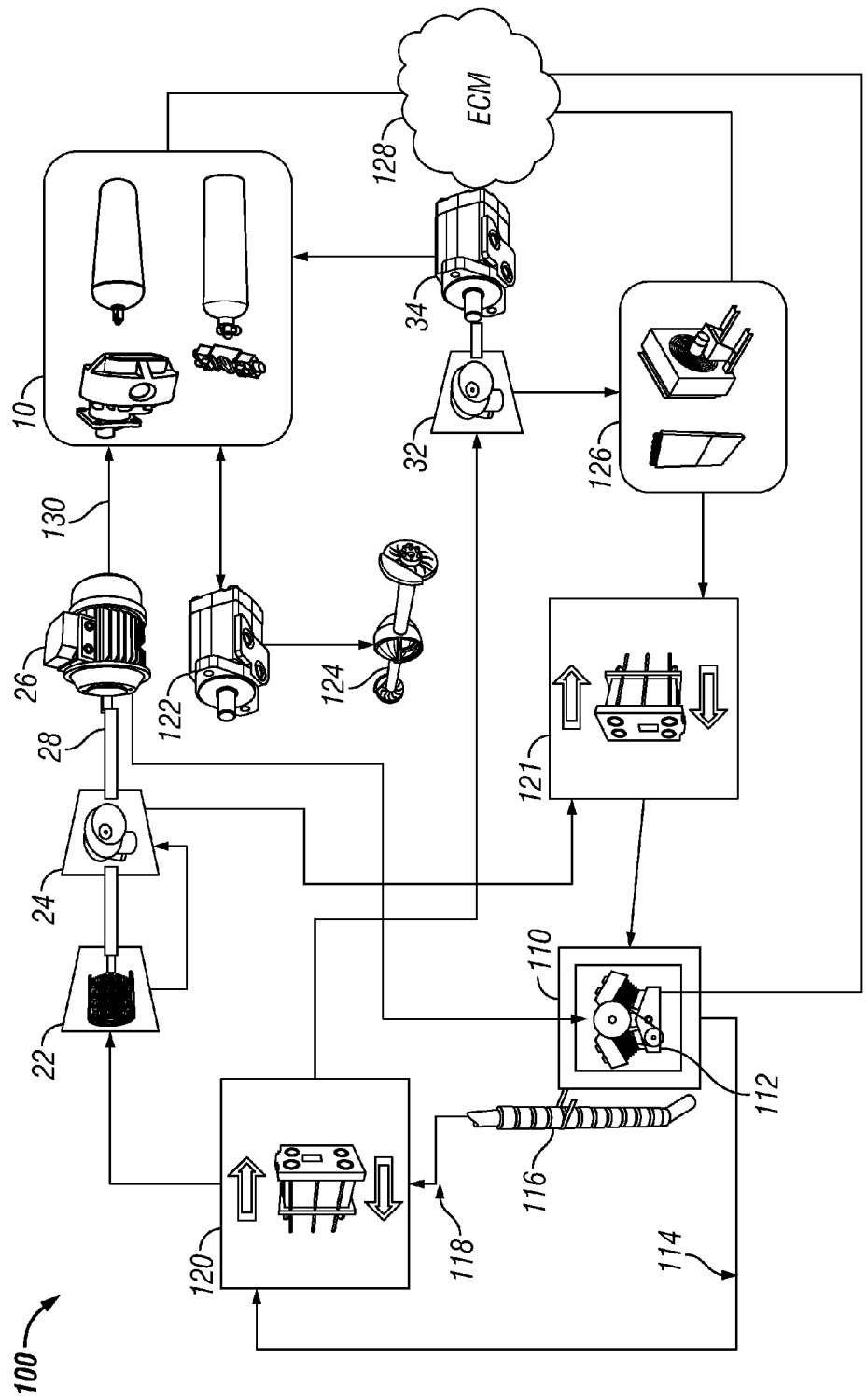
FIG. 6 illustrates a waste heat recovery system for an internal combustion engine.

In FIG. 6, a waste heat recovery system 100 is shown for an internal combustion engine. The system includes an engine cooling jacket 110 surrounding an engine 112. The cooling jacket 110 contains refrigerant 114 which cycles through other components of the system and acts as a medium for heat exchange. The refrigerant 114 should be chemically unreactive and have appropriate thermodynamic properties, such as a boiling point below the target temperature of the desired application, high heat of vaporization, moderate density in liquid phase, and a high critical temperature. The system 100 also includes an exhaust outlet 116 to expel gases and heat produced (exhaust 118) during combustion within the engine 112.

The exhaust 118 enters a first heat exchanger 120 in order to heat the refrigerant 114 and then enters the compressor 22 of the regenerator module 20 where it is compressed before entering the turbocharger 24. The exhaust 116 exits the turbocharger 24 to the ambient air, thus spinning the common shaft 28 and drawing ambient air into the turbocharger 24 at the same time. The spinning of the common shaft 28 is utilized by the regenerator 26 to create electricity which is sent to the power box 10. The compressed ambient air is sent to a second heat exchanger 121.

Further illustrated in FIG. 6 is a traction motor 122 connected to the power box 10 and an axle 124. The traction motor 122 receives electricity from the power box 10 in order to provide power to the axle 124 during peak torque needs. The traction motor 122 is also capable of generating electricity through regenerative braking and can then provide this electricity to the power box 10. The power box 10 also receives electricity from the KERS 30. The KERS 30 produces electricity by receiving hot refrigerant 114 from the first heat exchanger 120 into the second turbocharger 32 which then spins the shaft 36 causing the generator 34 to produce electricity.

The hot refrigerant 114 exits the turbocharger 32 into a refrigerant cooling unit 126. The cooled refrigerant 114 is then transferred to the second heat exchanger 121 where it cools the compressed ambient air from the turbocharger 24 of the regenerator module 20. The refrigerant 114 is transferred to the engine cooling jacket 110 in order to cool the engine 112. An engine control module 128 can also be provided to control and coordinate the functioning of the engine 112, the power box 10, and the refrigerant cooling unit 126.

Figure 7:
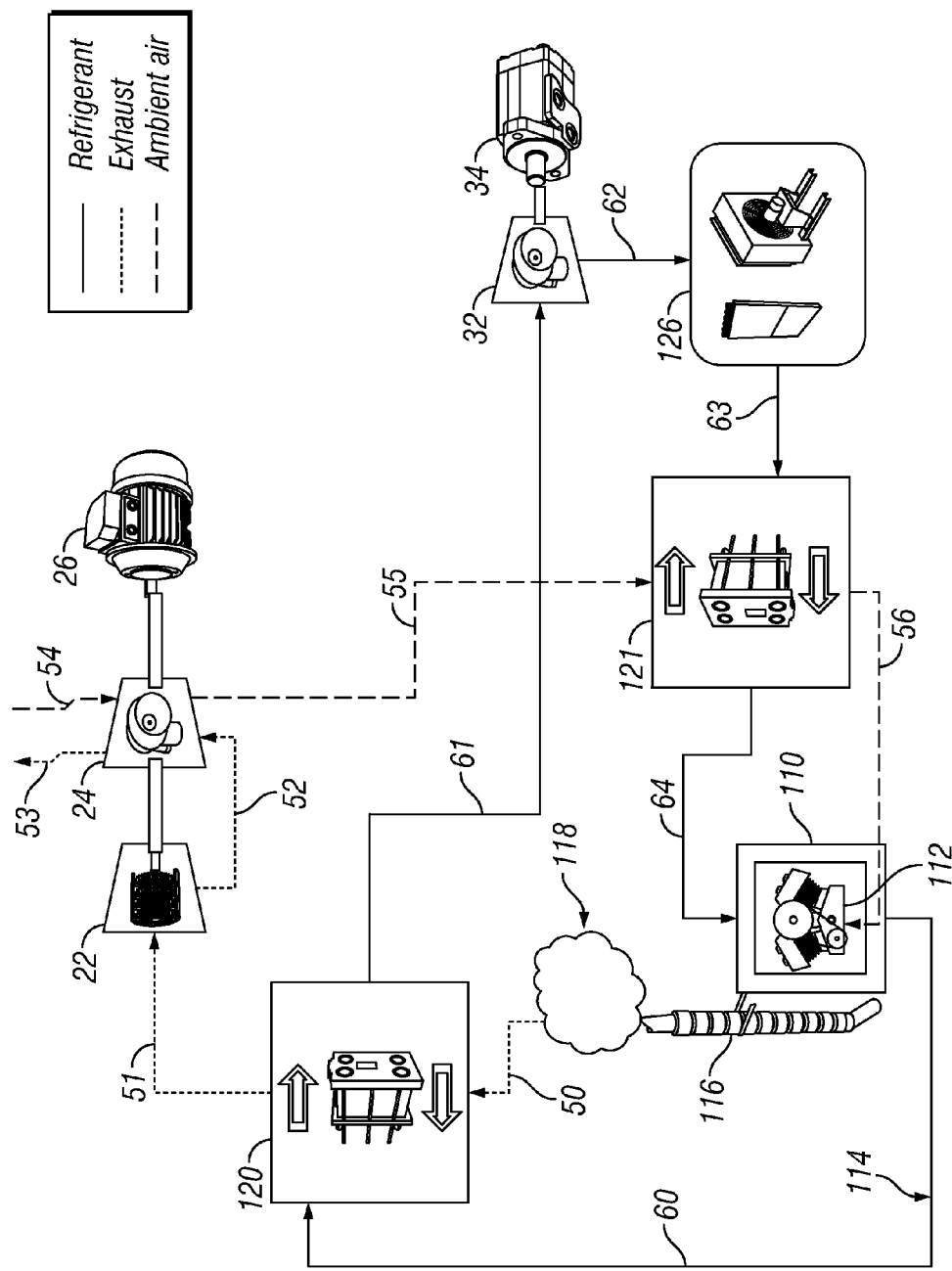
FIG. 7 illustrates the heating and cooling cycle of exhaust, ambient air, and refrigerant within the waste heat recovery system.

FIG. 7 illustrates the heating and cooling cycle of the exhaust 118 and ambient air in the waste heat recovery system 100. Hot exhaust 118 is transferred from the engine 112 to the first heat exchanger 120, represented by arrow 50, where it is cooled slightly before being transferred to the compressor 22, represented by arrow 51. The compressor 22 compresses the exhaust 118 before it is transferred to the turbocharger 24 of the regenerator module 20, represented by arrow 52. The turbocharger 24 expels the compressed hot exhaust 118 outside of the system 100, represented by arrow 53, and, at the same time, draws cooler ambient air into the system 100, represented by arrow 54. The ambient air is then transferred to the second heat exchanger 120, represented by arrow 55, where it is cooled. The cooled ambient air is then transferred to the engine 112 to aide in cooling the engine, represented by arrow 56.

Also shown in FIG. 7 is the heating and cooling cycle of the refrigerant 114 in the waste heat recovery system 100. Hot refrigerant 114 exits the engine 112 into the first heat exchanger 120, shown by arrow 60. Warm refrigerant 114 then enters the KERS 30, represented by arrow 61, where heat from the refrigerant is converted to electrical energy. Warm refrigerant 114 exits the KERS into the refrigerant cooling unit 126, represented by arrow 62. Cooled refrigerant 114 then enters the second heat exchanger 121, represented by arrow 63. Cooled refrigerant 114 from the second heat exchanger 121 is then provided to the engine cooling jacket 110, represented by arrow 64.

Figure 8:
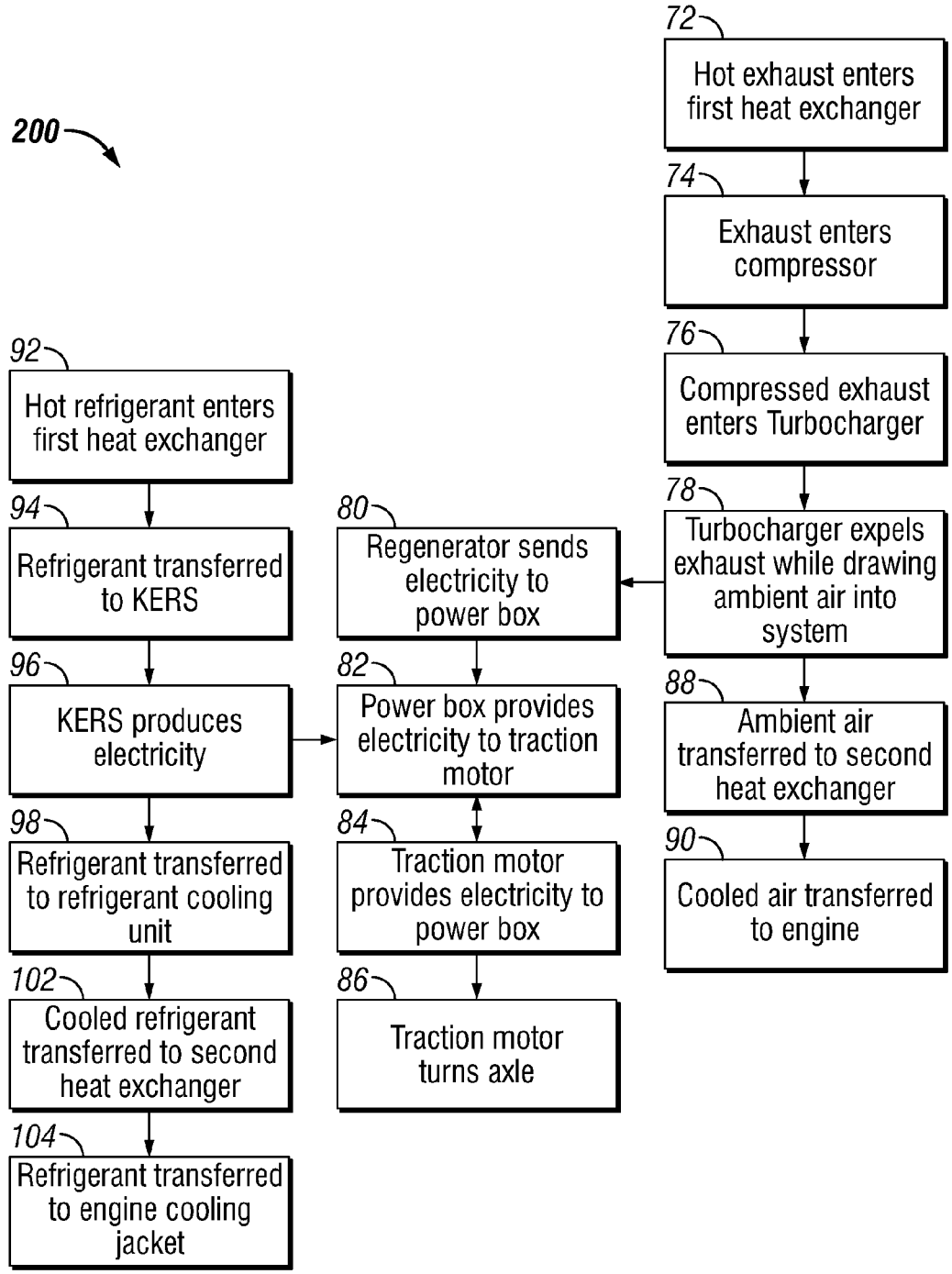
FIG. 8 illustrates a method for recovery of waste heat for conversion to mechanical energy.

FIG. 8 illustrates a method 200 for recovery of waste heat for conversion to mechanical energy. Hot exhaust 118 exits the exhaust outlet 116 into a first heat exchanger 120, shown in block 72, where heat is transferred from the hot exhaust 118 to the refrigerant 114. The exhaust 118 then enters the compressor 22 of the regeneration module 20, as shown in block 74, where it is compressed before entering the turbocharger 24, as shown in block 76. The turbocharger 24 then expels the exhaust 118 while drawing in ambient air from outside the system 100 and turning the common shaft 28, as shown in block 78. The regenerator 26 converts the energy of the spinning common shaft 28 into electricity which is then provided to the power box 10, as shown in block 80. Block 82 shows the power box 10 providing electricity to the traction motor 122. The traction motor 122 also provides electricity back to the power box 10 during regenerative braking, as shown in block 84. The traction motor then turns an axle, as shown in block 86. The ambient air drawn into the system by the turbocharger 24 is provided to the second heat exchanger 121, as shown in block 88, where it is cooled. The cooled ambient air is then transferred to the engine 112, as shown in block 90, in order to cool the engine 112.

FIG. 8 further illustrates the method 200 where hot refrigerant 114 exits the engine 112 into the first heat exchanger 120, shown in block 92. Warm refrigerant 114 then enters the KERS 30, shown in block 94, where heat from the refrigerant is converted to electrical energy, shown in block 96, which is provided to the power box. Warm refrigerant 114 exits the KERS into the refrigerant cooling unit 126, shown in box 98. Cooled refrigerant 114 then enters the second heat exchanger 121, shown in box 102. Cooled refrigerant 114 from the second heat exchanger 121 is then provided to the engine cooling jacket 110, shown in box 104.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method of converting waste heat recovery to mechanical enemy, comprising the steps:
    receiving exhaust gas from an engine utilizing a first heat exchanger wherein heat contained in said exhaust as is transferred to a refrigerant;
    supplying said exhaust gas to a regenerator module wherein said regenerator produces electricity utilizing said exhaust gas;
    conducting said electricity to a power box;
    receiving said refrigerant utilizing said first heat exchanger;
    supplying said refrigerant to a kinetic energy recovery system to produce electricity which is transferred to said power box;
    conducting electricity from said power box to a traction motor wherein said traction motor turns an axle;
    receiving said refrigerant into a refrigerant cooling unit;
    compressing ambient air with a turbocharger;
    supplying said refrigerant to a second heat exchanger wherein said compressed ambient air is cooled; and
    supplying said refrigerant and said compressed cooled ambient air to an engine cooling jacket to cool said engine.

2. The method of claim 1 further comprising conducting electricity generated by said traction motor during regenerative braking to said power box.

3. The method of claim 1 wherein said power box comprises an AC/DC inverter, a battery pack, and a capacitor.

4. The method of claim 1 wherein said power box comprises an electric hydraulic fluid pump, a hydraulic fluid reservoir, valves, and a high pressure hydraulic fluid tank.

5. The method of claim 1 wherein said regenerator module comprises a compressor, a turbocharger, and a regenerator.

6. A waste heat recovery apparatus comprising:
    an engine having an exhaust outlet configured to deliver exhaust gas and a cooling jacket;
    a first heat exchanger configured to receive said exhaust gas operably connected to said cooling jacket and said exhaust outlet;
    a regenerator module operably connected to said first heat exchanger and a power box, said regenerator module being configured to generate electricity provide electricity to said power box;
    a second heat exchanger, configured to receive compressed ambient air from said regenerator module, operably connected to said cooling jacket;
    a refrigerant cooling unit configured to cool down refrigerant operably connected to said second heat exchanger; and
    a kinetic energy recovery system (KERS) configured to convert heat energy received from said first heat exchanger into electricity and further configured to provide said electricity to said power box.

7. The waste heat recovery apparatus of claim 6 further comprising a traction motor operably connected to said power box and configured to receive electricity from said power box; and
    an engine control module (ECM) configured to control and coordinate functioning of said engine, said power box and said refrigerant unit.

8. The apparatus of claim 7 further comprising an axle operably connected to and powered by said traction motor.

9. The apparatus of claim 6 wherein said power box comprises an AC/DC inverter, a battery pack, and a capacitor.

10. The apparatus of claim 6 wherein said power box comprises an electric hydraulic fluid pump, a hydraulic fluid reservoir, valves, and a high pressure hydraulic fluid tank.

11. The apparatus of claim 6 wherein said regenerator module comprises a compressor, a turbocharger, and a regenerator.

12. The apparatus of claim 6 wherein said KERS comprises a turbocharger and a generator.

13. The apparatus of claim 6 wherein said power box comprises a flywheel.

14. A waste heat recovery system comprising:
    an engine having an exhaust outlet configured to deliver exhaust gas and a cooling jacket;
    a first heat exchanger configured to receive said exhaust gas operably connected to said cooling jacket and said exhaust outlet;
    a compressor configured to compress said exhaust gas operably connected to said first heat exchanger;
    a turbocharger configured to receive said exhaust gas being compressed by said compressor;
    a regenerator operably connected to said turbocharger and a power box, said regenerator being configured to provide electricity to said power box;
    a second heat exchanger configured to receive compressed ambient air from said turbocharger operably connected to said cooling jacket and said turbocharger;
    a refrigerant cooling unit configured to cool down refrigerant operably connected to said second heat exchanger; and
    a kinetic energy recovery system (KERS) configured to convert heat enemy received from said first heat exchanger into electricity and further configured to provide said electric it to said power box.

15. The waste heat recovery system of claim 14 further comprising a traction motor operably connected to said power box and configured to receive electricity from said power box; and an engine control module (ECM), configured to control and coordinate functioning of said engine, said power box and said refrigerant unit.

16. The waste heat recovery system of claim 15 further comprising an axle operably connected to said traction motor and powered by said traction motor.

17. The waste heat recovery system of claim 14 wherein said power box comprises an AC/DC inverter, a battery pack, and a capacitor.

18. The waste heat recovery system of claim 14 wherein said power box comprises an electric hydraulic fluid pump, a hydraulic fluid reservoir, valves, and a high pressure hydraulic fluid tank.

19. The waste heat recovery system of claim 14 wherein said power box comprises a flywheel.

20. The waste heat recovery system of claim 14 wherein said KERS comprises a turbocharger and a generator.

* * * * *